(12) United States Patent
Himmer et al.

(10) Patent No.: US 11,981,222 B2
(45) Date of Patent: May 14, 2024

(54) SYSTEM WITH STATIONARY INDUCTIVE CHARGING DEVICE

(71) Applicant: MAHLE International GmbH, Stuttgart (DE)

(72) Inventors: Thomas Himmer, Reichenbach (DE); Holger Schroth, Maulbronn (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 18/286,219

(22) PCT Filed: Apr. 7, 2022

(86) PCT No.: PCT/EP2022/059237
§ 371 (c)(1),
(2) Date: Oct. 9, 2023

(87) PCT Pub. No.: WO2022/214585
PCT Pub. Date: Oct. 13, 2022

(65) Prior Publication Data
US 2024/0083277 A1    Mar. 14, 2024

(30) Foreign Application Priority Data
Apr. 9, 2021 (DE) .......................... 102021203526.4

(51) Int. Cl.
*B60L 53/302* (2019.01)
*B60L 53/12* (2019.01)
(Continued)

(52) U.S. Cl.
CPC ............. *B60L 53/302* (2019.02); *B60L 53/12* (2019.02); *H01F 27/025* (2013.01);
(Continued)

(58) Field of Classification Search
CPC .................................................... B60L 53/302
(Continued)

(56) References Cited

U.S. PATENT DOCUMENTS

2019/0241093 A1\* 8/2019 Shimauchi .......... H01M 10/613
2019/0333676 A1   10/2019 Shin
(Continued)

FOREIGN PATENT DOCUMENTS

CN        211151622 U    7/2020
DE    102017005303 A1   12/2018
(Continued)

OTHER PUBLICATIONS

English abstract for JP-2011135729.
(Continued)

*Primary Examiner* — Jerry D Robbins
(74) *Attorney, Agent, or Firm* — Fishman Stewart PLLC

(57) ABSTRACT

A system may include at least one stationary inductive charging device for inductively charging a motor vehicle and at least one compressor. The charging device may include a base plate, a cover, an interior volume defined between the base plate and the cover, a coil, a magnetic flux guiding unit, an intermediate wall, an inlet, and an outlet. The intermediate wall may divide the interior volume into a distribution chamber and a receiving chamber. The coil and the magnetic flux guiding unit may be arranged in the receiving chamber. The inlet may be arranged on a pressure side of the compressor such that compressed gas flows into the distribution chamber via the inlet. The intermediate wall may define at least one passage fluidically connecting the distribution (Continued)

chamber and the receiving chamber such that gas flows into the receiving chamber via the passage with reduced pressure.

20 Claims, 8 Drawing Sheets

(51) Int. Cl.
*H01F 27/02* (2006.01)
*H01F 27/08* (2006.01)
*H01F 27/28* (2006.01)
*H02J 50/00* (2016.01)
*H02J 50/10* (2016.01)
*H01F 38/14* (2006.01)

(52) U.S. Cl.
CPC ....... *H01F 27/085* (2013.01); *H01F 27/2876* (2013.01); *H02J 50/005* (2020.01); *H02J 50/10* (2016.02); *H01F 38/14* (2013.01)

(58) Field of Classification Search
USPC .......................................... 320/108
See application file for complete search history.

(56) References Cited

U.S. PATENT DOCUMENTS

| | | | | |
|---|---|---|---|---|
| 2021/0050741 | A1* | 2/2021 | Pinkos | H01F 27/025 |
| 2021/0129694 | A1* | 5/2021 | Laemmle | B60L 53/12 |
| 2022/0337089 | A1* | 10/2022 | Powell, Jr. | H02J 50/005 |

FOREIGN PATENT DOCUMENTS

| | | |
|---|---|---|
| DE | 102018214792 A1 | 10/2019 |
| DE | 102018216435 A1 | 2/2020 |
| EP | 2808976 A1 | 12/2014 |
| EP | 3758029 A1 | 12/2020 |
| FR | 2732169 A1 | 9/1996 |
| FR | 3070097 A1 | 2/2019 |
| JP | 2011135729 A | 7/2011 |

OTHER PUBLICATIONS

English abstract for CN-211151622.
English abstract for FR-2732169.
German Search Report for DE-102021203526.4, dated Jan. 26, 2022.
German Search Report for DE-102022203488.0, dated Feb. 15, 2023.

* cited by examiner

SYSTEM WITH STATIONARY INDUCTIVE CHARGING DEVICE

CROSS-REFERENCE TO RELATED APPLICATIONS

This application claims priority to International Application No. PCT/EP2022/059237, filed on Apr. 7, 2022, and German Application No. DE 102021203526.4, filed on Apr. 9, 2021, the contents of both of which are hereby incorporated by reference in their entirety.

TECHNICAL FIELD

The present invention relates to a system having a stationary inductive charging device for the inductive charging of a motor vehicle.

BACKGROUND

It is known to employ induction for charging a rechargeable battery in a motor vehicle in order to make possible a wireless charging. For this purpose, a stationary inductive charging device interacts with a mobile inductive charging device of the motor vehicle. For the inductive charging, a magnetic alternating field is generated in the stationary charging device during the operation, which in the motor vehicle is captured by means of the mobile charging device and employed for charging the battery.

For producing the magnetic alternating field, the stationary inductive charging device, also referred to as "ground assembly", comprises a coil. In addition, the charging device comprises a unit for guiding the magnetic field generated by the coil, which includes at least one magnetic flux guiding element, for example a ferrite body. Here, "guiding" the magnetic field is to mean that the magnetic field is influenced by the magnetic flux guiding elements for an improved operation of the charging device. For example, the magnetic field can be better steered in the direction of the mobile charging device by means of the magnetic flux guiding elements. During the operation of the device, heat develops in particular in the coil and in the unit. In order to make possible an effective and/or quick charging of the battery of the motor vehicle, such charging devices are operated with a corresponding power. As a consequence, more heat is incurred during the operation, in particular in the coil and the unit which can result in damage and/or power reduction of the device.

From EP 3 758 029 A1 an induction charging device having a housing is known. In the housing a coil part is arranged, which comprises a coil, a coil carrier and a magnetic flux guiding unit. The coil part floats on a fluid which can be pumped via a pump into the housing and out from the housing, in order to cool the coil part.

SUMMARY

The present invention therefore deals with the object of stating for a system having at least one stationary inductive charging device for the inductive charging of a motor vehicle an improved or at least another embodiment, which is characterised by an increased efficiency and/or a simplified operation.

According to the invention, this object is solved through the subject matter of the independent claim(s). Advantageous embodiments are the subject matter of the dependent claim(s).

The present invention is based on the general idea of cooling a stationary inductive charging device for the inductive charging of a motor vehicle by means of a compressed gas, wherein the gas is introduced into a chamber, in which components of the stationary inductive charging device to be cooled, subsequently also referred to as charging device in brief, are received, wherein the compressed gas while flowing into the said chamber is expanded. Even by the gas flowing into the chamber, the said components are cooled. The expansion of the gas simultaneously results in a cooling of the gas. Consequently, the cooling effect is increased through the expansion of the gas. Thus, an improved cooling of the said components is achieved. In this way, the charging device can be operated with an increased power wherein at the same time an effective cooling takes place. Further, a simple and efficient cooling of the said components is realised.

According to the inventive idea, the device is part of a system which additionally includes a compressor for compressing the gas. The charging device comprises a floorplate and a cover located opposite the floorplate, which delimit an internal volume of the charging device. Between the base plate and the cover, the charging device comprises a wall, in the following also referred to as intermediate wall. The intermediate wall divides the internal volume into a distribution chamber, which is formed between the base plate and the intermediate wall, and a receiving chamber, which is formed between the intermediate wall and the cover. The charging device, further, comprises a coil which generates a magnetic field during the operation. In addition, the charging device comprises a magnetic flux guiding unit for guiding the magnetic field generated by the coil. The magnetic flux guiding unit, in the following also referred to as unit in brief, includes for this purpose at least one magnetic flux guiding element, which in the following is also referred to as element in brief. The coil and the unit are received in the receiving chamber. Further, the charging device comprises an inlet which serves for admitting the gas compressed with the compressor into the distribution chamber and is consequently fluidically connected to the distribution chamber. The inlet is arranged on the pressure side of the compressor, so that gas compressed by the compressor flows along a flow path of the gas via the inlet into the distribution chamber. In the intermediate wall, at least one local passage is formed, which fluidically connects the distribution chamber with the receiving chamber, so that the flow path leads through the at least one passage from the distribution chamber into the receiving chamber. This means that the gas flows via the at least one passage from the distribution chamber into the receiving chamber. This takes place in such a manner that the gas, with reduced pressure, flows into the receiving chamber, i.e. is expanded and thus cooled while flowing into the receiving chamber. Thus, a cooling of the unit and/or of the coil takes place with the gas. Practically, the charging device, further, comprises an outlet for letting out the gas from the receiving chamber through which the flow path accordingly leads.

For expanding the gas while flowing into the receiving chamber, a lower pressure than in the distribution chamber is preferably present in the receiving chamber during the operation. In other words, the gas in the distribution chamber has a higher pressure than in the receiving chamber.

The cover is advantageously spaced apart from the base plate in the height direction towards a motor vehicle to be inductively charged with the device. The magnetic field generated by the coil and guided by the unit practically enters the vehicle via the cover. For this purpose, the cover is produced from a non-metallic material, for example from plastic.

It is preferred when with the base plate a shielding of the generated magnetic field takes place. For this purpose, the base plate is advantageously produced from a metallic material.

Preferably, the base plate and the cover are parts of a housing of the charging device, which encloses the interior volume. For this purpose, outer walls of the housing extending along the distance direction of the base plate to the cover can be provided for this purpose between the base plate and the cover.

As explained, a guiding of the magnetic field generated by the coil takes place with the unit. For this purpose, the at least one element is suitably configured. For this purpose, the at least one element advantageously has a relative magnetic permeability of at least 2. Preferably, the at least one element is a ferrite body, in particular a ferrite plate.

Basically, the unit can be arranged relative to the coil as desired.

Preferably, the unit, in particular the at least one element, is arranged on the side of the coil facing the base plate. The at least one element is thus arranged in the receiving chamber between the coil and the base plate. Thus, an effective guiding of the magnetic field generated by the coil, in the following also referred to as magnetic field, takes place in the direction of the cover. This results in an effective interaction of the charging device with the motor vehicle to be charged, via the cover. This results in an effective charging of the motor vehicle to be charged.

Basically, the distribution chamber can be formed in any way between the base plate and the intermediate wall. It is preferred when the distribution chamber is delimited by the base plate and the intermediate wall.

Basically, the receiving chamber can be configured in any way between the intermediate wall and the cover. It is advantageous when the receiving chamber is delimited by the intermediate wall and the cover.

Preferably, the distribution chamber is configured in such a manner that the gas flowing into the distribution chamber with pressure is distributed within the distribution chamber and, by means of two or more passages, flows, preferentially evenly, into the receiving chamber. Here it is conceivable providing in the distribution chamber a suitable structure for distributing the gas, wherein the structure is preferably configured in such a manner that it does not preferably reduce the pressure in the gas.

Preferred are embodiments, in which at least one of the at least one passage is arranged in such a manner that the gas on the side of the unit facing away to the cover, in particular of the at least one element, flows into the receiving chamber. This allows a simple and effective cooling of the unit and thus of the at least one element. A distance of the at least one element from the passage, in particular from the intermediate wall, can range from several millimetres to some centimetres.

Basically, the gas can be any gas.

It is preferred when the gas is air. The compressor thus generates compressed air during the operation, which flows via the inlet into the distribution chamber, wherein the compressed air by means of the at least one passage flows into the receiving chamber and expands in the process. This allows a simple and safe operation of the system.

Preferably, the charging device comprises a support structure arranged in the interior volume, which by means of supports extending between the cover and the base plate transmits to the base plate a mechanical load acting on the cover.

In particular, the support structure is configured in such a manner that it passes on to the base plate loads transmitted to the cover by a motor vehicle, without damage to the charging device resulting in the process.

As mentioned above, the charging device is stationary. This means that the charging device, in contrast with the motor vehicle, is arranged in a fixed place. For this purpose, the charging device can be arranged on a base, for example a parking bay. It is likewise conceivable to at least partially lower the charging device below the base in such a manner that the charging device is at least partially invisible from the outside.

The inductive charging of the motor vehicle takes place through the interaction of the charging device with a corresponding device on/in the motor vehicle, which includes a coil interacting with the coil of the charging device.

Preferred are embodiments, in which at least one of the at least one passage is formed as a nozzle. Thus, the nozzle allows a targeted or directed flow of the air into the receiving chamber. It is thus possible to subject the unit and/or the coil in the receiving chamber to a targeted flow and thus to a targeted cooling. In addition, an advantageous reduction of the pressure present in the gas thus takes place while flowing into the receiving chamber and consequently a more effective cooling.

Basically, the respective at least one passage can have any orientation, i.e. extend from the distribution chamber to the receiving chamber in any way.

It is preferred when at least one of the at least one passage, advantageously the respective passage, follows a straight course.

It is conceivable that at least one of the at least one passage extends obliquely relative to the distance direction of the base plate to the cover. It is likewise conceivable that at least one of the at least one passage extends along the distance direction.

Embodiments are considered advantageous, in which at least one of the at least one passage extends directed in the direction of an associated of the at least one elements, so that the associated element, by means of the passage, can be subjected to a targeted flow and cooled. In other words, an extent running from a first passage opening that is open towards the distribution chamber as far as to a second passage opening that is open towards the receiving chamber of at least one of the at least one passage is directed towards an associated element, so that by means of the passage gas flows in the direction of the associated element. Thus, a more efficient cooling of the respective associated element takes place.

Basically, the intermediate wall can in be formed level and flat and comprise the at least one passage.

Preferred are embodiments, in which the intermediate wall comprises at least one pipe portion, which projects in the direction of the unit and through which the flow path of the gas leads in such a manner that the unit during the operation is subjected to gas flow.

For this purpose, the pipe portion can comprise at least one passage by means of which the element is subjected to the flow, in the direction of which the pipe portion projects. Thus, a more targeted flow onto the unit and thus a more effective cooling is possible.

The respective pipe portion can be spaced apart from the unit.

Likewise conceivable are embodiments, in which at least one of the at least one pipe portion is part of a support of the support structure. Advantageously, the support is configured in multiple parts, wherein the pipe portion is arranged on the side of the unit facing the base plate. Further, the support comprises a portion arranged on the side of the unit facing the cover, which in the following is also referred to as upper portion. In the distance direction, the pipe portion corresponds to a continuation of the upper portion spaced apart in the distance direction from the upper portion, so that a load to the cover is transmitted via the unit in a linear continuation to the pipe portion and via the pipe portion to the base plate.

At least one magnetic flux guiding element can be arranged between pipe portion and upper portion, so that the support holds the element via the spaced-apart arrangement of pipe portion and upper portion.

Preferably, transversely to the distance direction of the base plate to the cover the element is larger than the pipe portion. Thus, the element protrudes laterally over the pipe portion. The element is held centrally by the pipe portion.

It is advantageous when at least one of the at least one pipe portion lies against the cover and is configured in such a manner that it transmits a load on the base plate acting on the cover, in particular by a motor vehicle. In addition, one of the at least one pipe portions can also be part of the support structure.

It is preferred when, in the distance direction of the base plate to the cover, the element is clamped between the pipe portion and the upper portion. This means that the pipe portion is supported on the side of the element facing the cover and the upper portion on the side facing the base plate. Thus, there is a reliable load transmission from the cover to the base plate that is gentle on the element.

Here it is conceivable that at least one of the at least one element extends into the pipe portion so that the element within the pipe portion is in contact with the gas and is thus cooled.

In preferred embodiments, a valve, in the following also referred to as outlet valve, and/or a diaphragm is arranged downstream of the receiving chamber, in particular in the outlet, for adjusting the pressure in the receiving chamber in such a manner that during the operation the pressure in the receiving chamber is lower than the pressure in the distribution chamber. For this purpose, the diaphragm can be suitably configured in particular in such a manner that it opens the flow through the outlet when a predetermined pressure in the receiving chamber is exceeded. The outlet valve can also be configured accordingly. It is also conceivable to control the outlet valve for opening and blocking the flow through the outlet.

Alternatively or additionally, a vessel with a liquid can be arranged between the receiving chamber and the environment, in particular between the receiving chamber and the outlet, through which the flow path from the receiving chamber into the environment leads. Thus, in particular the entry of liquids and/or moisture from the environment into the receiving chamber is prevented or at least reduced. In this way, the receiving chamber is thus separated from the environment outside the operation, wherein this separation takes place without wear and in a self-regulating manner.

Preferred are embodiments, in which between the distribution chamber and the compressor, in particular in the inlet, a valve for establishing and separating the fluidic connection of the distribution chamber with the compressor is arranged. With the valve, in the following also referred to as inlet valve, it is thus possible to admit gas compressed by the compressor into the distribution chamber or prevent the flow of the gas into the distribution chamber. Accordingly, the inlet valve is adjustable between an operating position and a blocking position, wherein the inlet valve opens the fluidic connection of the distribution chamber to the compressor in the operating position and interrupts the same in the blocking position.

It is conceivable that gas flowing out via the outlet is output into the environment so that the compressor always compresses fresh gas, which can likewise originate from the environment.

Also conceivable are embodiments, in which the flow path follows a circular path. This means that the gas is circulated in the system. For this purpose, the outlet is fluidically connected to the compressor. In this way it is possible to keep the gas easily clean in an effective manner and/or avoid the entry of undesirable components into the charging device in a simple manner.

It is to be understood that the system can also comprise two or more charging devices, which are arranged spaced apart from one another. The respective charging device practically serves for charging an associated motor vehicle. It is also conceivable however that two or more charging devices serve for charging a common vehicle.

It is to be understood that the system can comprise two or more compressors, each of which compress gas during the operation. In particular, it is conceivable to provide for two or more of the charging devices an associated compressor each. Thus, an independent operation of the respective charging device is possible.

In preferred embodiments, the system includes two or more charging devices, wherein for at least two of the charging devices, advantageously for the respective charging device, a common compressor is provided. This makes possible a simple and cost-efficient operation of the system. The compressor is advantageously arranged decentralised, i.e. outside the respective charging device, and is accordingly fluidically connected to the inlets of the charging device.

It is preferred when at least two of the charging devices, advantageously the respective charging device, comprise an inlet valve, wherein by means of the inlet valve gas compressed by the common compressor then merely flows into the distribution chamber and subsequently into the receiving chamber when a cooling of the associated charging device is needed. This is the case in particular when the charging device is in operation, i.e. charges an associated motor vehicle. Thus, the system can be operated effectively and cost-effectively. Preferably, at least one control device is employed for this purpose which is connected to the inlet valves and configured in such a manner that it adjusts the respective inlet valve accordingly. The at least one control device practically adjusts the respective inlet valve into the operating position when the associated inductive charging device is in operation and into the blocking position, when the associated charging device is inactive. Obviously, both the adjusting into the operating position and also the adjusting into the blocking position can each be advanced or delayed in time.

Advantageously, the control device is configured in such a manner that it can adjust the respective inlet valve in any positions between a completely open and a completely closed position. In other words, the operating position does not necessarily correspond to the completely open position of the associated inlet valve.

Preferably, this adjustment of at least one of the inlet valves, preferentially of the respective inlet valve, takes place dependent on at least one sensor parameter determined by means of a sensor. Thus, the system advantageously comprises at least one sensor which is communicatingly connected to the control device. The control device is configured in such a manner that it adjusts at least one of the inlet valves, preferentially the respective inlet valve between the operating position and the blocking position dependent on at least one sensor parameter. This is practical for acoustic reasons in order to reduce the flow noises during the operation and/or for unloading the compressor and thus to increase efficiency.

Preferably, at least one of the sensor parameters is a temperature. This means that at least one of the sensors is a temperature sensor. The system can comprise for two or more of the charging devices, in particular for all charging devices, a common control device. It is also conceivable that for at least one of the charging devices an associated control device is provided, so that the system comprises at least two control devices.

Preferred are embodiments, in which the system comprises a cooling device which during the operation cools the gas, preferably the gas compressed by means of the at least one compressor.

It is conceivable for this purpose to provide in at least one of the at least one charging device a suitable heat exchanger of the cooling device through which the gas flows for cooling.

It is likewise conceivable, with at least one of the at least one charging device, to cool the base plate. Thus, the base plate in this variant is also part of the cooling device and is actively cooled. For this purpose, cooling channels are advantageously provided in the base plate through which a coolant flows.

Preferred are embodiments, in which the cooling device comprises a common heat exchanger for at least two of the charging devices. Thus, a more effective operation of the system and a simplified construction is achieved.

It is particularly preferred when the cooling device is arranged de-centrally, i.e. outside the charging device. This results in a particular simple and effective configuration of the system.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It Shows, in Each Case Schematically

DETAILED DESCRIPTION

Figure 6:
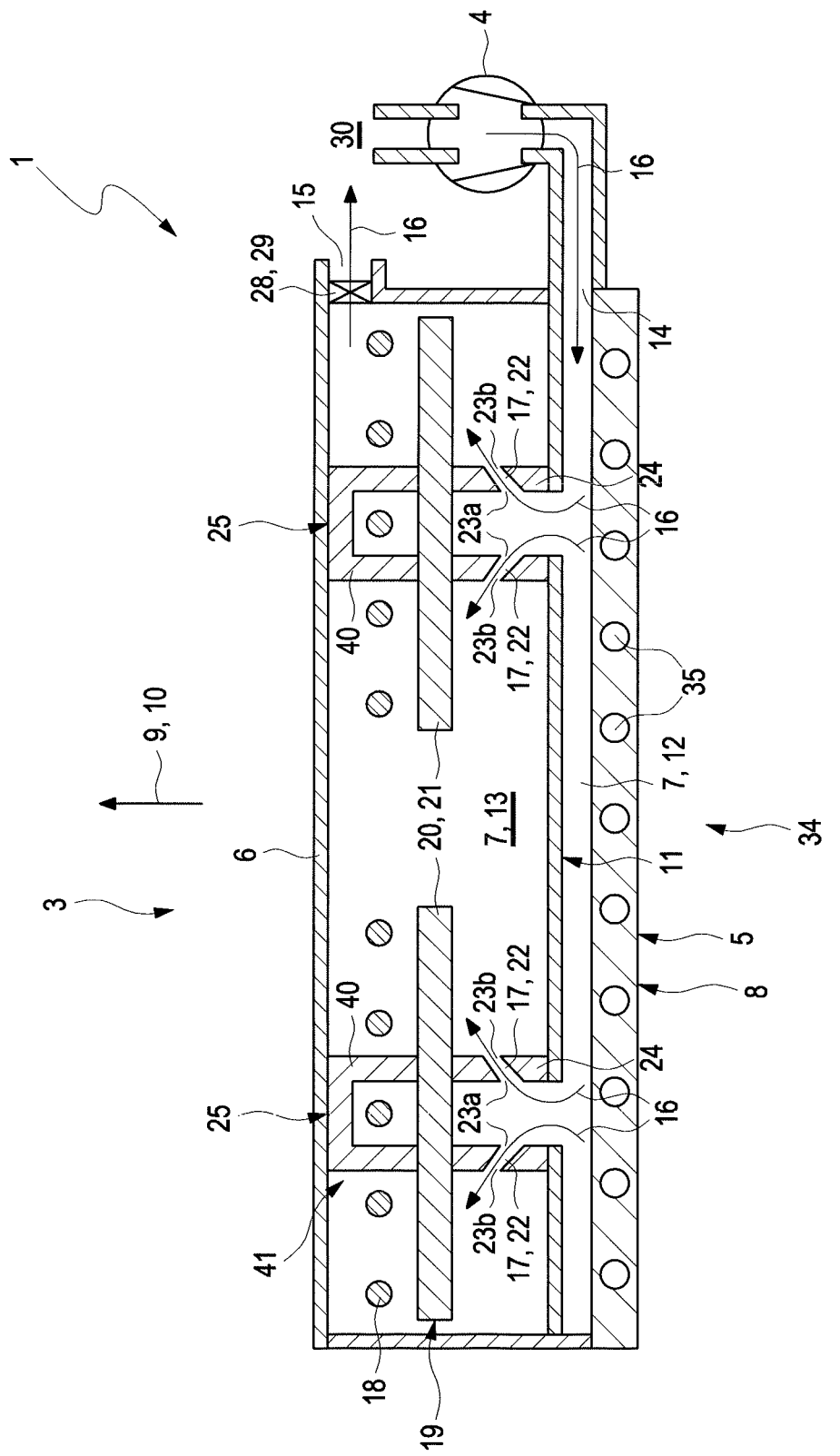
Figure 7:
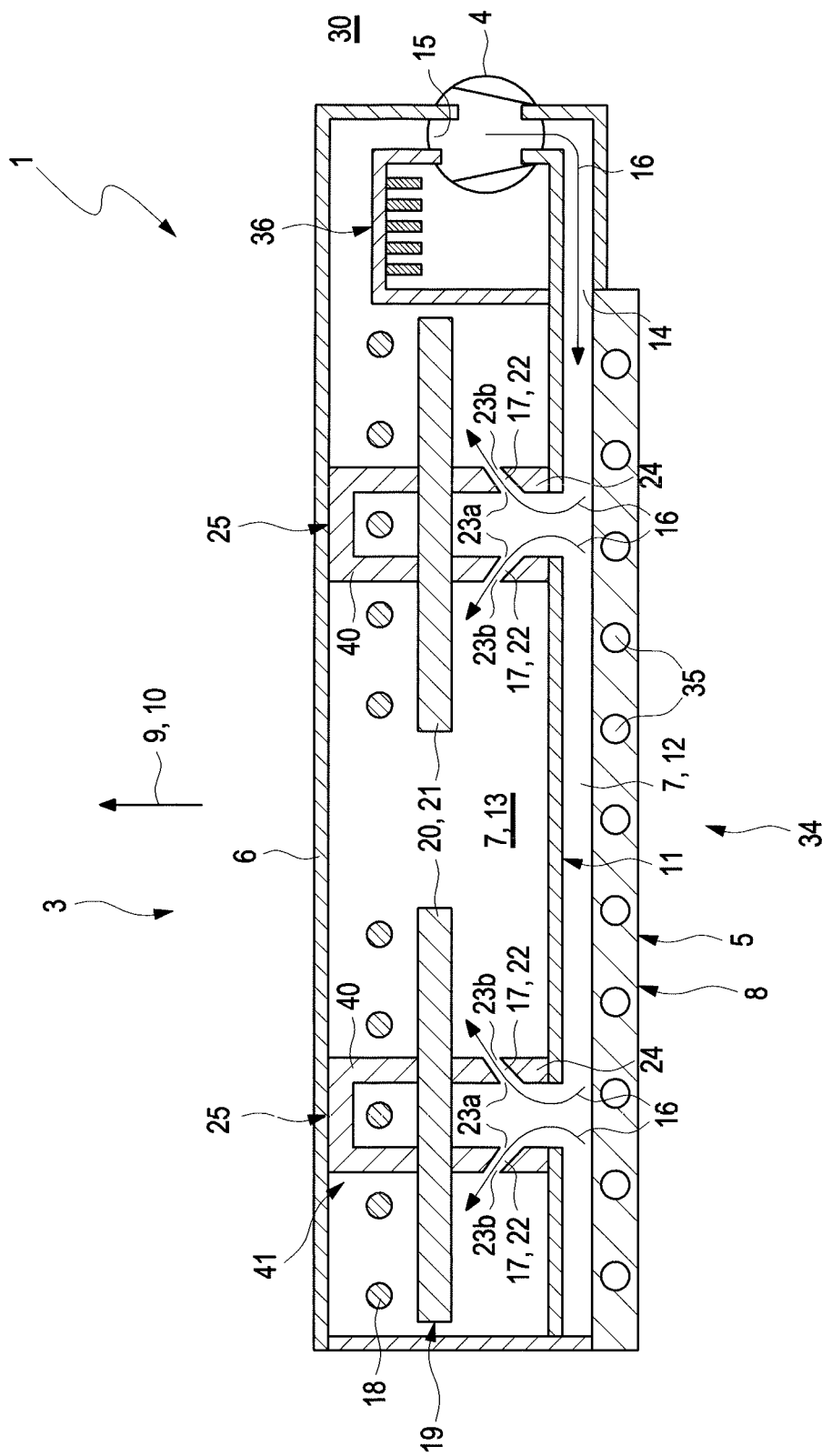
Figure 8:
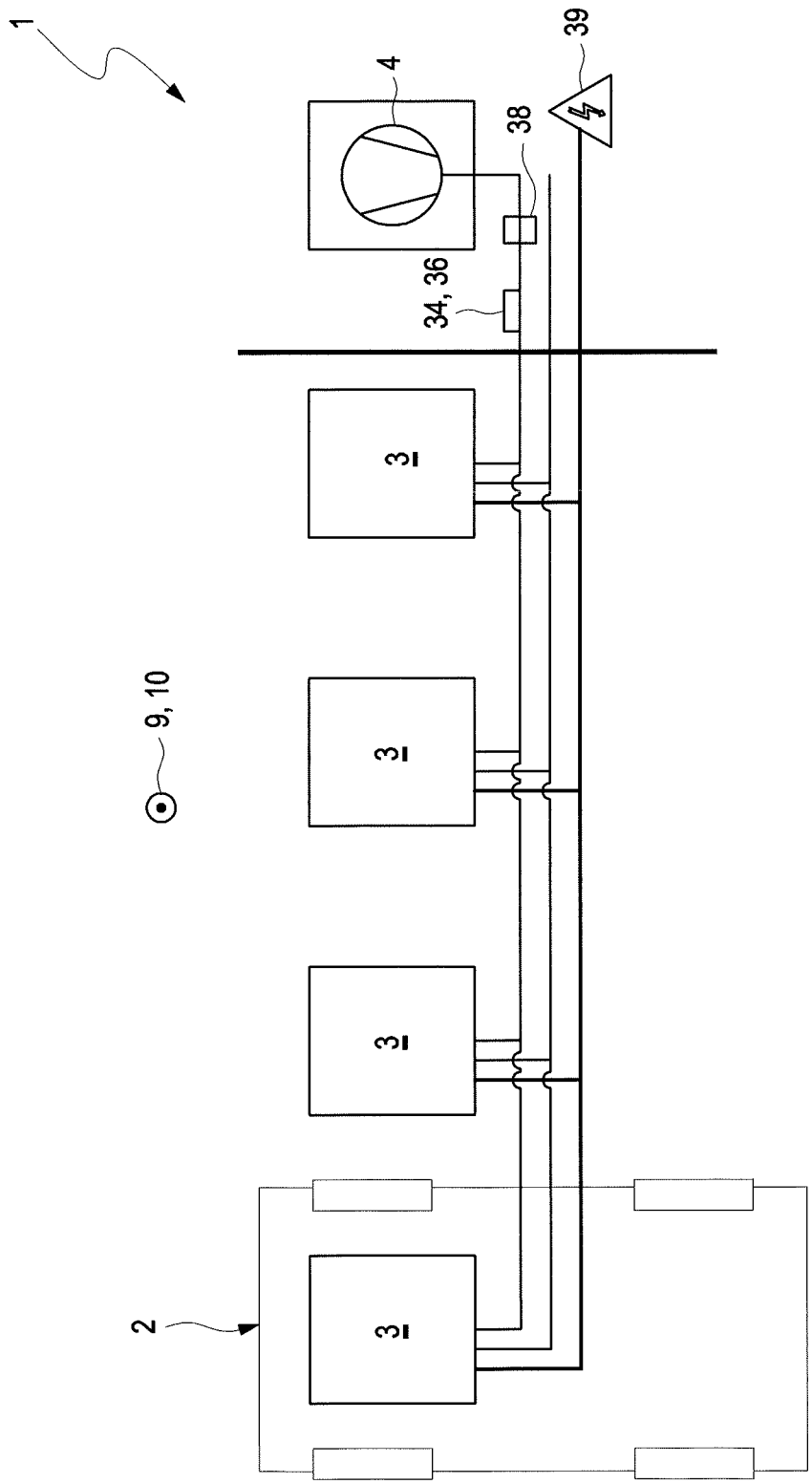
FIG. 8 shows a greatly simplified plan view of the system in a further exemplary embodiment.

A system 1, as shown in the FIGS. 1 to 8, serves for the inductive and wireless charging of motor vehicles 2 (see FIG. 8).

According to the FIGS. 1 to 8, the system 1 includes a stationary inductive charging device 3, which in the following is also referred to as charging device 3 in brief. The system 1, further, includes a compressor 4, which during the operation compresses a gas, in the shown exemplary embodiments, air, and thus generates compressed air. The charging device 3 comprises a base plate 4 and a cover 6 located opposite the base plate 5. The base plate 5 and the cover 6 delimit an interior volume 7 of the charging device 3. The base plate 5 and the cover 6, in the shown exemplary embodiments, are parts of a housing 8 of the charging device 3, in which the interior volume 7 is enclosed. In the shown exemplary embodiments, the base plate 5 and the cover 6 extend substantially flat and plate-like transversely to the distance direction 9, which corresponds to the height direction 10. Further, between the base plate 5 and the cover 6 a wall 11 is provided, which in the following is also referred to as intermediate wall 11. The intermediate wall 11 divides the interior volume 7 into a distribution chamber 12 formed between the base plate 5 and the intermediate wall 11 and a receiving chamber 13 formed between the intermediate wall 11 and the cover 6. In the shown exemplary embodiments, the distribution chamber 12 is delimited by the base plate 5 and the intermediate wall 11. In the shown exemplary embodiments, the receiving chamber 13 is delimited by the intermediate wall 11 and the cover 6. The charging device 3, in particular the housing 8, has an inlet 14, via which the compressed air generated by means of the compressor 4 can flow into the distribution chamber 12. Consequently, the inlet 14 is fluidically connected to the distribution chamber 12. In the shown exemplary embodiments, the inlet 14 is formed in each case on the housing 8. Further, the charging device 3 has an outlet 15 for letting air out from the receiving chamber 13, which consequently is fluidically connected to the receiving chamber 13. In the shown exemplary embodiments the outlet 15 is formed on the housing 8. For admitting compressed air into the distribution chamber 12, the inlet 14 is arranged on the pressure side of the compressor 4, so that compressed air generated by the compressor flows along a flow path 16 of the gas, in particular of the air, via the inlet 14 into the distribution chamber 12. Further, the flow path 16 leads from the distribution chamber 12 into the receiving chamber 13 and via the outlet 15 out of the receiving chamber 13. In order to make possible a flow of the air from the distribution chamber 12 into the receiving chamber 13, the intermediate wall 11 comprises at least one passage 17, which is locally formed and fluidically connects the distribution chamber 12 with the receiving chamber 13. In the shown exemplary embodiments, the intermediate wall 11 comprises multiple such passages 17. In the receiving chamber 13 a lower pressure than in the distribution chamber 12 is present, so that the air when flowing into the receiving chamber 13 is expanded and thus cooled. In the receiving chamber 13 there is located a coil 18 of the charging device 3, which during the operation generates a magnetic alternating field. The coil 18 is supported by a coil support which is not shown. In addition, a magnetic flux guiding unit 19 is arranged in the receiving chamber, which serves for guiding the magnetic field generated by the coil 18. In the shown exemplary embodiments and advantageously, the magnetic flux guiding unit 19, in the following also referred to as unit 19 in brief, is arranged on the side of the coil 18 facing away to the cover 6. For guiding the magnetic field, the unit 19 comprises at least one magnetic flux guiding element 20, in the following also referred to as element 20 in brief. As is evident from the FIGS. 1 to 7, the unit 19 comprises multiple such elements 20, of which in the FIGS. 1 to 7 two each are visible. Advantageously, the coil 18, electrically separated from the unit 19, is thermally connected to the unit 19 (not shown). As is evident, further, from the FIGS. 1 to 7, the respective element is formed plate-like. The respective element 20 is preferentially a ferrite plate 21. During the generating of the magnetic alternating field, heat is incurred both in the coil 18 and also in the unit 19. A cooling of the unit 19 and of the coil 18 takes place with the air flowing through the passages 17 in the receiving chamber 13. The expansion of the air while flowing into the receiving chamber 13 results in a cooling of the air and thus an improved cooling of the unit 19, in particular of the elements 20, and/or of the coil 18. Having flowed into the receiving chamber 13, the air flows via the outlet 15 out of the receiving chamber 13.

In the shown exemplary embodiments, the respective passage 17 is formed as a nozzle 22. The respective nozzle 22 is directed in the direction of an associated one of the elements so that the air flows via the nozzle 22 specifically in the direction of the associated element Thus, an improved cooling of the elements 20 is achieved.

Figure 1:
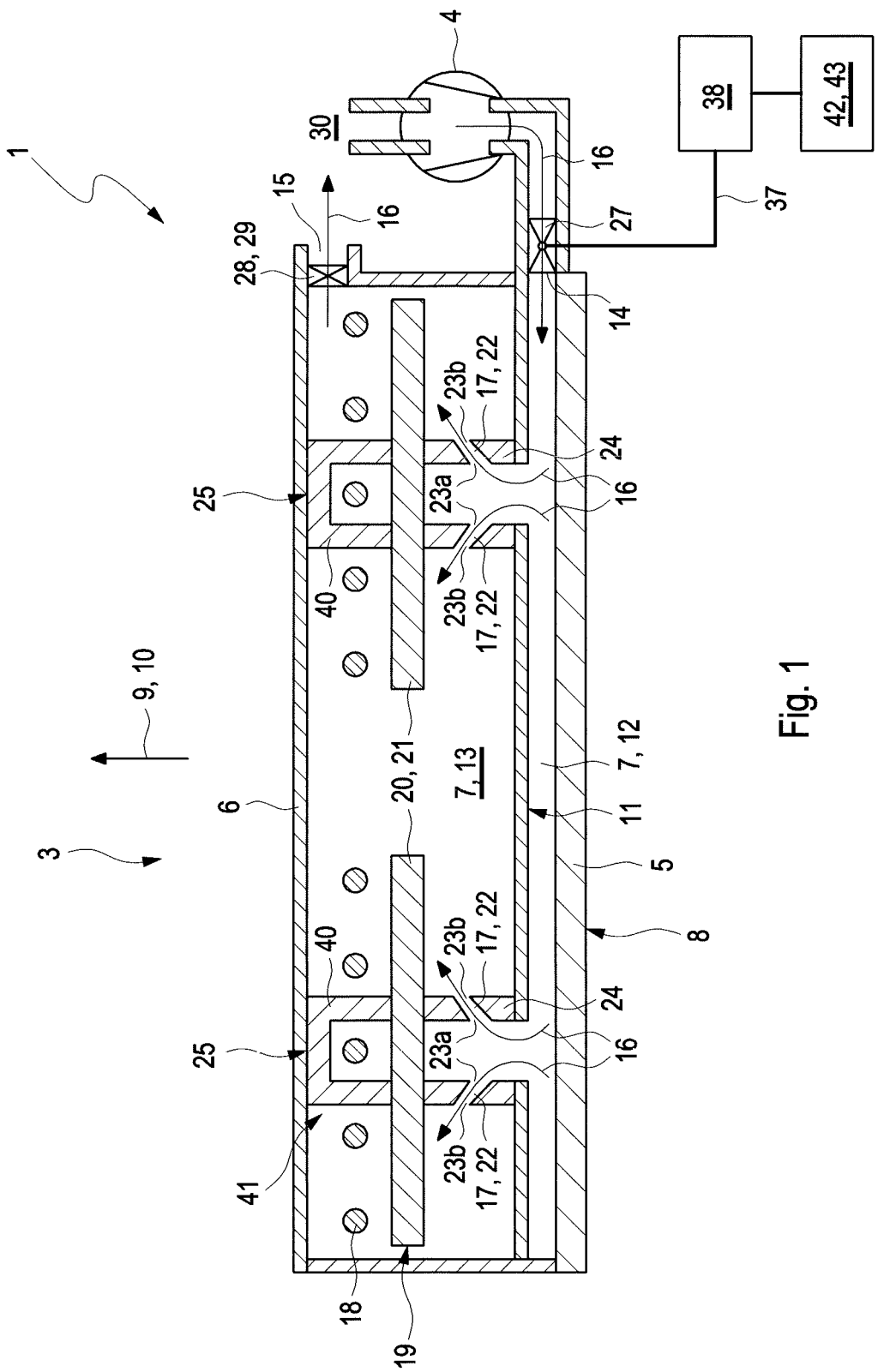
FIGS. 1 to 7 show a greatly simplified section each through a system with a charging device and a compressor each in a different exemplary embodiment.
Figure 2:
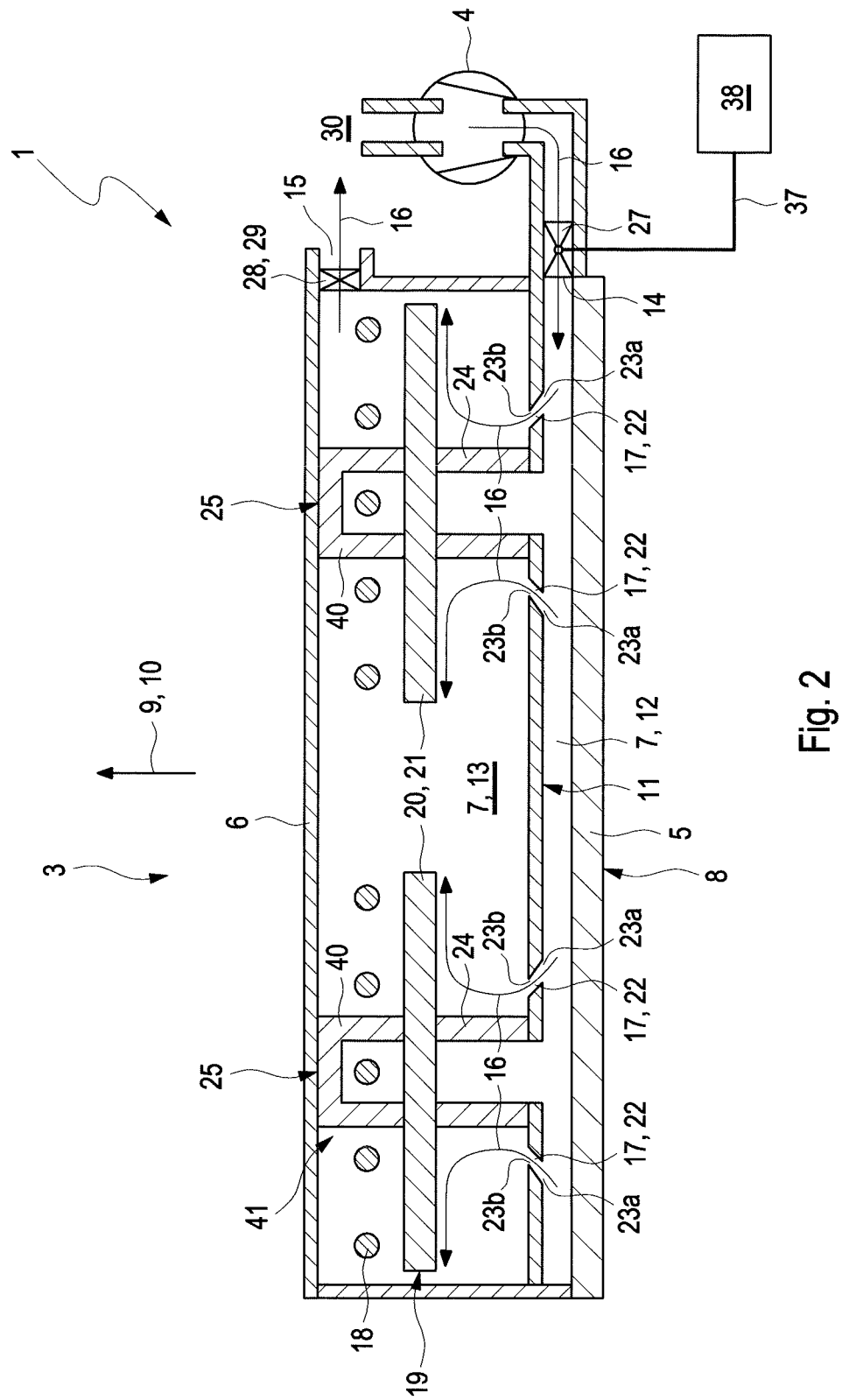

In the exemplary embodiments of the FIGS. 1 and 2 as well as 4 to 7, the passages 17 run obliquely to the distance direction 9 and height direction 10 respectively. The respective passage 17 thus extends between two passage openings 23, namely a first passage opening 23*a* that is open towards the distribution chamber 12 and a second passage opening 23*b* that is open towards the receiving chamber 13, wherein the extent of the passage 17 from the first passage opening 23*a* to the second passage opening 23*b* runs obliquely to the distance direction 9. Besides the passages 17 running obliquely to the distance direction 9 in the exemplary embodiment of FIG. 3, passages 17 such as extend along the distance direction 9 are also provided.

In the shown exemplary embodiments, the intermediate wall 11 comprises at least one pipe portion 24 projecting in the direction of the unit 19, wherein the pipe portion 24 is open towards the distribution chamber 12 and closed on the side facing away from the distribution chamber 12. In the shown exemplary embodiments, two such pipe portions 24 each can be seen, which are spaced apart from one another. The respective pipe portion 24 comprises at least one of the passages 17, in the shown examples multiple of the passages 17. The passages 17 are arranged distributed evenly, in particular in the manner of a rim, along the circumference of the pipe portion 24. Thus, in the shown exemplary embodiments, the outflow of air in the direction of an associated element 20 takes place by means of the passages 17 of the respective pipe portion 24.

In the exemplary embodiments of the FIGS. 1 and 2 as well as 4 to 7, the respective pipe portion 24 is part of a support 25, which serves for transmitting a load to the cover 6 to the base plate 5. For this purpose, the support comprises an upper portion 40 spaced apart from the pipe portion 24 in the distance direction 9, which is aligned with the associated pipe portion 24, i.e. corresponds to a linear continuation of the pipe portion 24. Pipe portion 24 and upper portion 40 are spaced apart from one another in the distance direction 9 and each receive the unit 19 and an element 20 respectively. The upper portion 40 is configured in the manner of a tubular body closed on one side. As is evident from the FIGS. 1 and 2 as well as 4 to 7, the upper portion 40, in these exemplary embodiments, lies with the closed side against the cover 6. Thus, a load acting on the cover 6, which can occur for example by way of a motor vehicle 2, can be directed by means of the upper portion 40 via the unit 19 in the distance direction 9 onto the pipe portion 24 and via further structures which are not shown, into the base plate 5. Here, the multiplicity of the supports 25 form a support structure 41 for the even load transmission. Preferably, the respective cross-section 40 is penetrated by the coil 18 (not shown).

Figure 3:
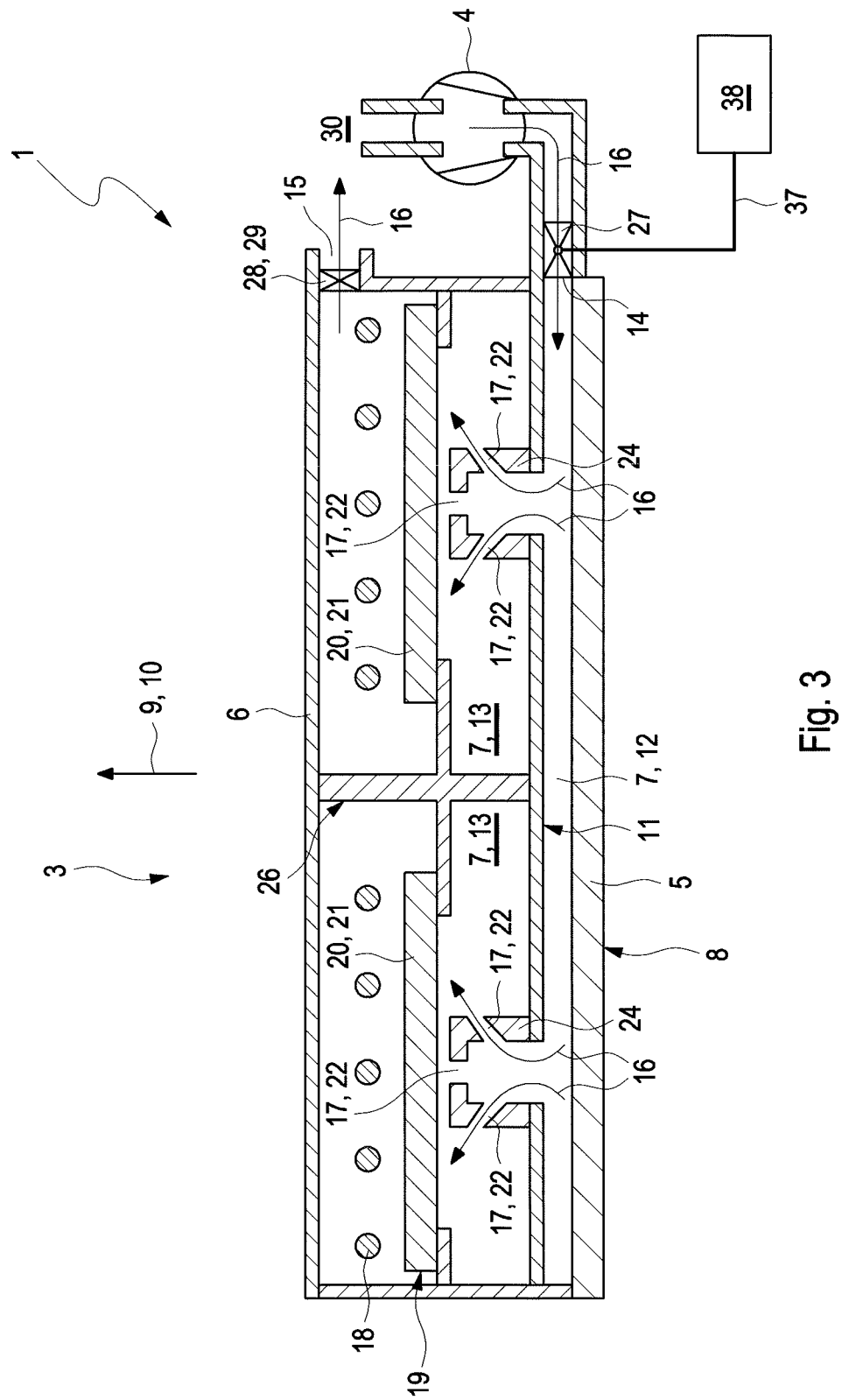

In the exemplary embodiment shown in FIG. 3, the pipe portions 24 are each spaced apart from the associated element 20. The passage 17 running along the distance direction 9 is arranged and formed on the side of the pipe portion 24 facing the associated element 20. In this exemplary embodiment, the charging device 3 in the receiving chamber 13 comprises a holding structure 26 that is separate from the pipe portions 24, which holds the elements 20 in the receiving chamber 13.

As is evident from the FIGS. 1 to 3, a valve 27 can be provided between the compressor 4 and the distribution chamber 12, which optionally establishes and disconnects a fluidic connection between the distribution chamber 12 and the compressor 4. With the valve 27, in the following also referred to as inlet valve 27, it is thus possible to admit the compressed air generated by the compressor 4 into the distribution chamber 12 merely when required in order to cool the unit 19 and/or the coil. Practically, this merely takes place in particular when a corresponding cooling is needed, in particular when the coil 18 generates the magnetic alternating field and the charging device 3 is thus active.

As is evident from the FIGS. 1 to 6, a valve 28 and/or a diaphragm 29 for letting air out of the receiving chamber 13 can be provided. By means of the valve 28, which in the following is also referred to as outlet valve 28, and/or of the diaphragm 29, it is thus possible, when required, to let air out of the receiving chamber 13 in order to reduce for example the pressure in the receiving chamber 13. Preferably, this takes place in such a manner that during the operation the pressure in the receiving chamber 13 is lower than the pressure in the distribution chamber 12.

Figure 4:
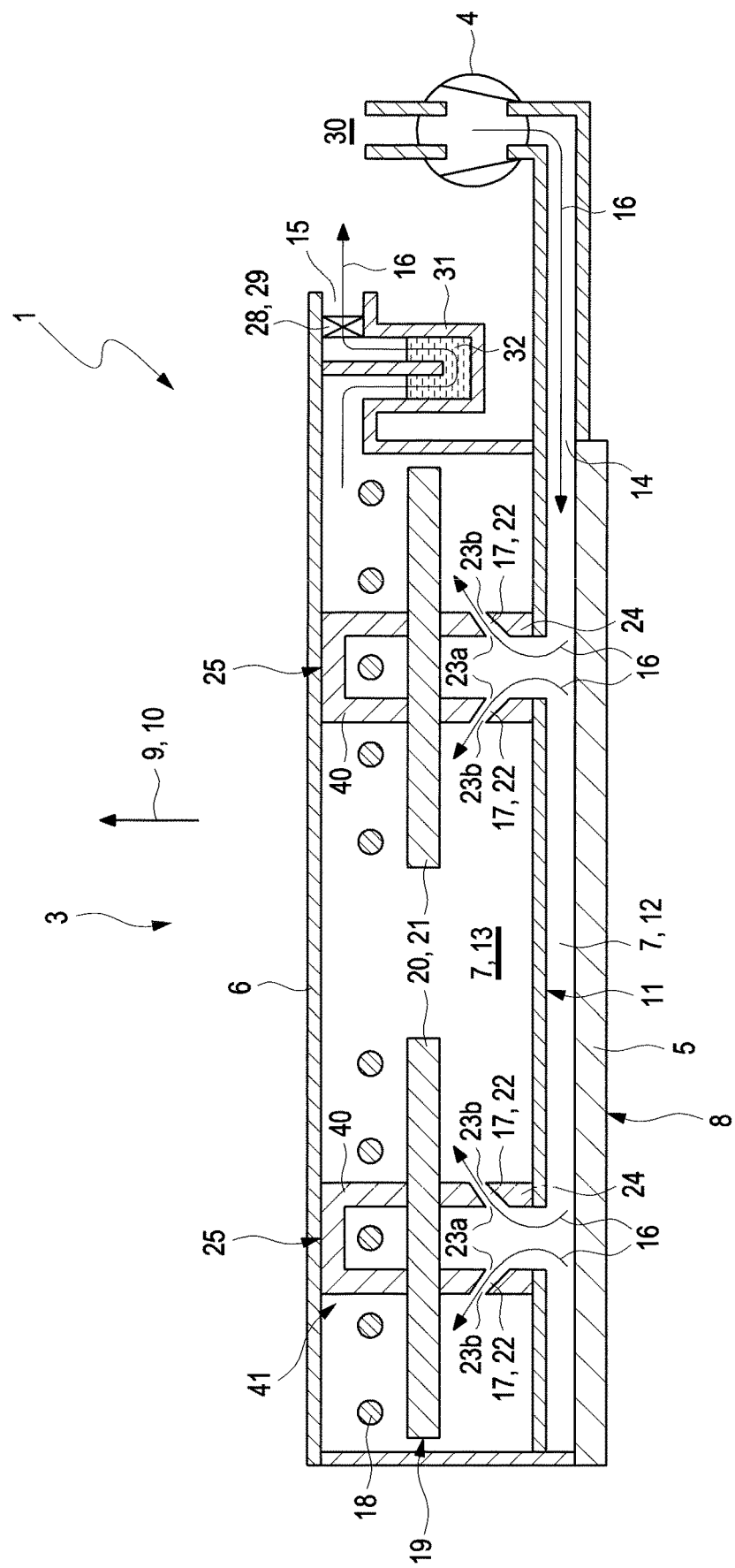
Figure 5:
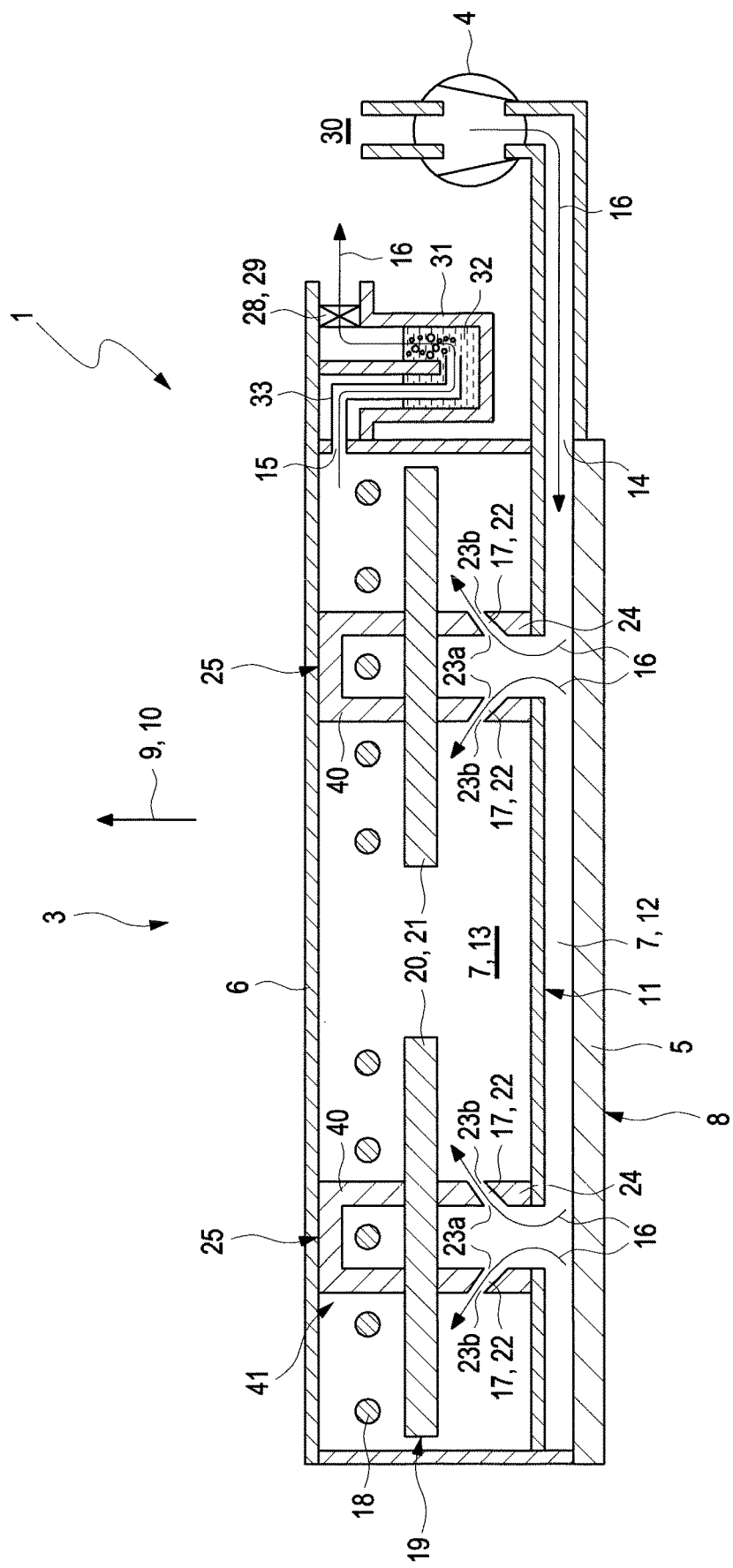

In the exemplary embodiments of the FIGS. 4 and 5, a vessel 31 with a liquid 32 is arranged between the receiving chamber 13 and the environment 30, wherein the flow path 16 leads through the liquid 32, so that the air, on leaving the receiving chamber 13, flows through the liquid 32. In the exemplary embodiments of the FIGS. 4 and 5, the vessel 31 with the liquid 32 is arranged upstream of the outlet valve 28 and the diaphragm 29 respectively. In the exemplary embodiment of FIG. 4, the vessel 31 is arranged within the receiving chamber 13. By contrast, the vessel 31, in the exemplary embodiment of FIG. 5, is arranged outside the receiving chamber 13 and fluidically connected to the receiving chamber 13 by means of a tubular body 33, which enters the liquid 32.

According to the FIGS. 6 and 7, the system 1, for achieving an improved cooling, can comprise a cooling device 34 for cooling the air. In the shown exemplary embodiments, the cooling device 34 includes the base plate 5. This means that the base plate 5 is cooled during the operation in order to cool the air in the distribution chamber 12. In the shown exemplary embodiments, the base plate 5 is flowed through and cooled by a coolant (not shown). For this purpose, multiple cooling channels 35 are formed in the base plate. As is evident from FIG. 7, the cooling device 34 can likewise comprise a heat exchanger 36 which is flowed through by the air and a further fluid (not shown), so that heat from the air is transferred to the further fluid and the air is thus cooled. In the shown exemplary embodiment, the heat exchanger 36 is arranged, purely exemplarily, upstream of the compressor 4.

In the exemplary embodiments of the FIGS. 1 to 6, the compressor 4 sucks in air from the environment 30, compresses the same and feeds it via the inlet 14 to the distribution chamber 12.

As is evident from FIG. 7, the air can also flow in a cycle, i.e. the flow path 16 i.e. follow a cycle. In this case, the air is thus circulated. For this purpose, the outlet 15 is fluidically connected to the compressor 4 on the suction side of the compressor 4.

FIG. 8 shows a further exemplary embodiment of the system 1. According to FIG. 8, the system 1 can also comprise two or more charging devices 3, wherein in the exemplary embodiment of FIG. 8, purely exemplarily, four charging devices 3 are shown. As is evident from FIG. 8, a common compressor 4 can be provided in this exemplary embodiment for at least two of the charging devices 3, in the shown exemplary embodiment for all charging devices 3, which compressor 4 is arranged de-centrally, i.e. outside the charging devices 3 and spaced apart from these. The respective charging device 3 is fluidically connected to the compressor 4 and can thus be supplied with compressed air generated by the compressor 4. Preferably, the respective charging device 3 comprises an inlet valve 27 which is operated in such a manner that the fluidic connection between the compressor 4 and the distribution chamber 12 is opened for admitting compressed air into the distribution chamber 12 merely when required. This is the case, for example, when the charging device 3 inductively charges a motor vehicle 2. As is indicated in FIG. 8, for example merely one of the charging devices 3 can be employed for charging a motor vehicle 2 while another of the charging devices 3 is not employed for charging and is thus inactive. In the representation of FIG. 4, merely one of the charging devices 3 is active and is thus employed for charging the indicated motor vehicle 2, whereas the remaining charging devices 3 are inactive. Here it is possible by means of the inlet valves 27 to merely supply the active charging device 3 with compressed air whereas the supply of the inactive charging devices 3 is interrupted. For this purpose, the respective inlet valve 27, as indicated in the FIGS. 1 to 3, can be connected by means of a communicating connection 37 with an associated control device 38, which is configured in such a manner that it adjusts the inlet valve 27 accordingly. It is likewise possible, as indicated in FIG. 8, to provide a common control device 38 for the inlet valves 27 of the charging devices 3 of the system 1. As is merely shown in FIG. 1, the system 1 can comprise at least one sensor 42 that is communicatingly connected to the control device 38, wherein the control device 38 adjusts the inlet valve 27 dependent on a sensor parameter determined by means of the sensor 42. The inlet valve 27 can also take up any positions between a completely closed and a completely opened position. In the shown exemplary embodiments, the system, purely exemplarily, comprises merely one sensor 42, which is configured as a temperature sensor 43.

As is evident in FIG. 8, it is further provided in the system 1 that the charging devices 3 are each electrically supplied by a common electric energy source 39. As merely indicated in FIG. 8, a common cooling device 34, in particular a common heat exchanger 36 for cooling the compressed air flowing into the charging devices 3 can be provided for at least two of the charging devices 3.

The invention claimed is:

1. A system, comprising at least one stationary inductive charging device for inductively charging a motor vehicle, and at least one compressor which, during operation, compresses gas, wherein:

the at least one stationary inductive charging device includes:
a base plate and a cover disposed opposite the base plate, which delimit an interior volume of the at least one stationary inductive charging device;
a coil which, during operation, provides a magnetic field;
a magnetic flux guiding unit including at least one magnetic flux guiding element for guiding the magnetic field provided via the coil;
an intermediate wall arranged between the base plate and the cover, the intermediate wall dividing the interior volume into (i) a distribution chamber defined between the base plate and the intermediate wall and (ii) a receiving chamber defined between the intermediate wall and the cover, the coil and the magnetic flux guiding unit arranged in the receiving chamber; and
an inlet fluidically connected to the distribution chamber;

the inlet is arranged on a pressure side of the at least one compressor such that the gas compressed via the at least one compressor flows along an associated flow path of the gas via the inlet into the distribution chamber;

the intermediate wall defines at least one passage fluidically connecting the distribution chamber with the receiving chamber such that the associated flow path extends via the at least one passage from the distribution chamber into the receiving chamber such that the gas flows via the at least one passage with reduced pressure into the receiving chamber; and the at least one stationary inductive charging device further includes an outlet for letting the gas out of the receiving chamber and through which the flow path extends.

2. The system according to claim 1, wherein the at least one passage is formed as a nozzle.

3. The system according to claim 1, wherein the at least one passage extends obliquely relative to a distance direction of the base plate to the cover.

4. The system according to claim 1, wherein an extent extending from a first passage opening that is open towards the distribution chamber to a second passage opening that is open towards the receiving chamber of the at least one passage is directed towards the at least one magnetic flux guiding element such that, via the passage, the gas flows in a direction of the at least one magnetic flux guiding element.

5. The system according to claim 1, wherein the at least one stationary inductive charging device further includes an additional intermediate wall including at least one pipe portion, which projects in a direction of the magnetic flux guiding unit and through which the associated flow path of the gas extends such that the magnetic flux guiding unit is subjected to gas inflow during operation.

6. The system according to claim 5, wherein the at least one pipe portion is part of a support, which on the between the at least one pipe portion and the support, including an upper portion disposed spaced apart from the at least one pipe portion in a distance direction of the base plate to the cover.

7. The system according to claim 5, wherein the at least one pipe portion includes the at least one passage.

8. The system according to claim 1, further comprising at least one of an outlet valve and a diaphragm arranged downstream of the receiving chamber such that during operation a pressure of the gas in the receiving chamber is lower than a pressure of the gas in the distribution chamber.

9. The system according to claim 1, further comprising a vessel with a liquid, through which the associated flow path extends, wherein the vessel is arranged between the receiving chamber and an environment.

10. The system according to claim 9, wherein the vessel is arranged between the receiving chamber and the outlet.

11. The system according to claim 1, further comprising an inlet valve arranged between the distribution chamber and the at least one compressor, wherein the inlet valve opens a fluidic connection of the distribution chamber with the at least one compressor when in an operating position and interrupts the fluidic connection when in a blocking position.

12. The system according to claim 11, wherein the inlet valve is arranged in the inlet.

13. The system according to claim 1, wherein the outlet of the at least one stationary inductive charging device is fluidically connected to the at least one compressor such that the associated flow path follows a cycle.

14. The system according to claim 1, wherein the at least one stationary inductive charging device includes at least two stationary inductive charging devices, and wherein the at least one compressor is a common compressor shared by the at least two stationary inductive charging devices.

15. The system according to claim 14, further comprising at least one control device, wherein:
the outlet of each of the at least two stationary inductive charging devices is fluidically connected to the common compressor such that the associated flow path follows a cycle;
each of the at least two stationary inductive charging devices includes an inlet valve;
the at least one control device is connected to the inlet valve of each of the at least two stationary inductive charging devices; and
the at least one control device is configured to adjust the inlet valve of an associated stationary inductive charging device of the at least two stationary inductive charging devices into (i) an operating position when the associated stationary inductive charging device is in operation and (ii) a blocking position when the associated stationary inductive charging device is inactive.

16. The system according to claim 15, further comprising at least one sensor communicatingly connected to the at least one control devices, wherein:
the at least one control device is further configured to adjust the inlet valve of at least one of the at least two stationary inductive charging devices between the operating position and the blocking position based on at least one sensor parameter of the at least one sensor; and
the inlet valve of each of the at least two stationary inductive charging devices is adjustable to a plurality of positions between the operating position and the blocking position.

17. The system according to claim 1, further comprising a cooling device, which cools the gas during operation.

18. The system according to claim 17, wherein:
the at least one stationary inductive charging device includes at least two stationary inductive charging devices; and
the cooling device includes a common heat exchanger for the at least two stationary inductive charging devices.

19. The system according to claim 1, further comprising an outlet valve arranged in the outlet downstream of the receiving chamber such that during operation a pressure of the gas in the receiving chamber is lower than a pressure of the gas in the distribution chamber.

20. The system according to claim 1, further comprising a diaphragm arranged in the outlet downstream of the receiving chamber such that during operation a pressure of the gas in the receiving chamber is lower than a pressure of the gas in the distribution chamber.

* * * * *